United States Patent
Kawanishi et al.

(10) Patent No.: US 6,340,605 B1
(45) Date of Patent: Jan. 22, 2002

(54) WAVEGUIDE TYPE OPTICAL INTEGRATED CIRCUIT ELEMENT AND METHOD FOR FABRICATING SAME

(75) Inventors: Hidenori Kawanishi, Nara; Atsushi Shimonaka, Yamatokoriyama, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/645,102

(22) Filed: Aug. 23, 2000

Related U.S. Application Data (62) Division of application No. 09/098,611, filed on Jun. 17, 1998, now Pat. No. 6,163,631.

(30) Foreign Application Priority Data

Jun. 20, 1997 (JP) .............................. 9-164824

(51) Int. Cl.[7] .............................................. H01L 21/20
(52) U.S. Cl. .......................................... 438/31; 438/42
(58) Field of Search .............................. 438/22, 23, 28, 438/29, 31, 37, 42, 43, 44, 46, 483, 400, 413, 429; 385/14, 32, 39; 372/50; 257/83, 84, 98

(56) References Cited

U.S. PATENT DOCUMENTS

| | | | |
|---|---|---|---|
| 4,956,682 A | * 9/1990 | Ohnaka | |
| 5,386,428 A | * 1/1995 | Thornton et al. | 372/50 |
| 5,863,809 A | * 1/1999 | Koren | 438/29 |
| 5,875,274 A | * 2/1999 | Stein | 385/49 |
| 5,888,840 A | * 3/1999 | Kudo | 438/31 |
| 6,025,207 A | * 2/2000 | Mersali et al. | 438/29 |

FOREIGN PATENT DOCUMENTS

| | | | |
|---|---|---|---|
| EP | 0 696747 A2 | * | 8/1996 |
| GB | 2247346 A | * | 2/1992 |
| GB | 2 298 958 A | * | 9/1996 |
| JP | 0 6163874 A | * | 11/1992 |
| JP | 09129964 A | * | 5/1997 |

OTHER PUBLICATIONS

Hurwitz et al. (1975). "Integrated GaAs—AIGaAs double–heterostructure lasers," *Applied Physics Letters* 27(4):241–243.

Kawanishi et al. (1996). "Chemically Assisted Ion Beam Itching of GaAs/AIGaAs Using Chlorine Ions," *JPN. J. Phys.* 35:L880–L882.

Nakano et al. (1993). "Absorptive–Grating Gain–Coupled Distributing–Feedback MQW Lasers with Low Threshold Current and High Single–Longitudinal–Mode Yield," *JPN J. Appl. Phys* 32:825–829.

Williams et al. "High Performance Buried Ridge DFB Lasers Monolithically Integrated With Butt Coupled Strip Loaded Passive Waveguides for OEIC", (1990), *Electronics Letters* 26(2):142–143.

* cited by examiner

*Primary Examiner*—Savitri Mulpuri
(74) *Attorney, Agent, or Firm*—Morrison & Foerster LLP

(57) ABSTRACT

The waveguide type optical integrated circuit element of this invention includes: a semiconductor laser of an end face output type; and an optical waveguide for propagating output light from the semiconductor laser, the optical waveguide including a plurality of semiconductor layers, the semiconductor laser and the optical waveguide being integrally formed side by side on a semiconductor substrate, wherein a single semiconductor layer is buried in an interface area between the semiconductor laser and the optical waveguide.

17 Claims, 11 Drawing Sheets

PRIOR ART

WAVEGUIDE TYPE OPTICAL INTEGRATED CIRCUIT ELEMENT AND METHOD FOR FABRICATING SAME

CROSS-REFERENCE TO RELATED APPLICATION

This application is a divisional of patent application Ser. No. 09/098,611, filed Jun. 17, 1998 now U.S. Pat. No. 6,163,631.

BACKGROUND OF THE INVENTION

1. Field of the Invention

The present invention relates to an optical integrated circuit element usable for optical communications, optical information processing, optical sensing, and the like. More specifically, the present invention relates to a waveguide type optical integrated circuit element where a semiconductor laser which acts as a light emitting device and an optical waveguide for propagating light output from the semiconductor laser are integrally formed on a same semiconductor substrate, and a method for fabricating such a waveguide type optical integrated circuit element.

2. Description of the Related Art

With the present rapid progress in multimedia society, it is anticipated that optical communications with a large capacity and a high speed of 100 Mbps or more will become available at home in near future. In particular, the development of wireless optical transmission technology not only makes wirings for communications unnecessary, but also provides a great benefit in realizing a communication link using a portable computer via a terminal at a nearby relay point.

Figure 6:
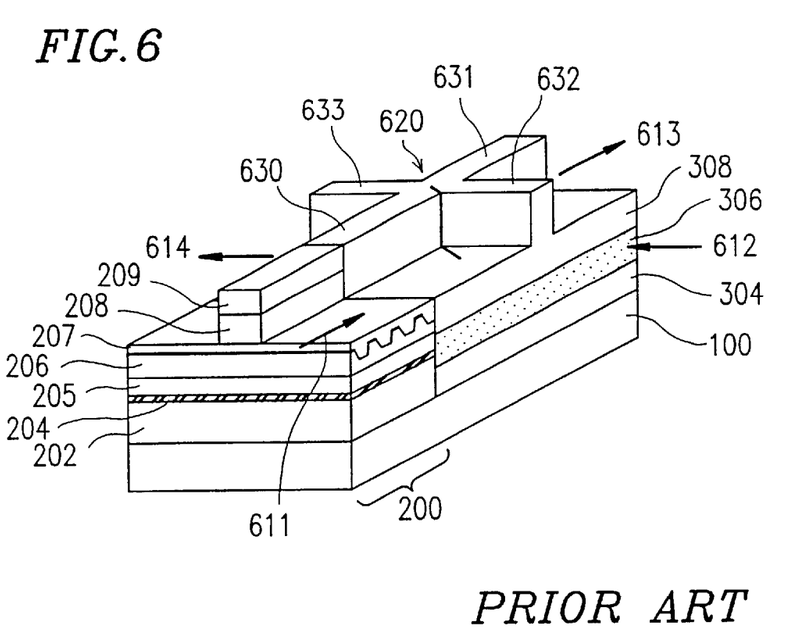
FIG. 6 is a perspective view of a conventional waveguide type optical integrated circuit element.

FIG. 6 shows an example of a conventional waveguide type optical integrated circuit element used as a receiver section of a wireless optical communication system.

The wireless optical communication system adopts a heterodyne wave detection method where frequency-modulated signal light 612 is combined with locally oscillated light 611 in the receiver section, to be converted into a beat signal having a frequency identical to the difference frequency. This method is advantageous over a general intensity modulation direct detection method in that the communication is excellent because a good signal to noise characteristic can be realized.

Referring to FIG. 6, the configuration of the conventional waveguide type optical integrated circuit element will be described together with the operation thereof. The waveguide type optical integrated circuit element includes a semiconductor laser 200 and two combinations of optical waveguides 630, 631 and 632, 633, which are integrally formed on a same substrate 100. An optical branching element 620 is also integrally formed at the crossing of the two combinations of optical waveguides 630, 631 and 632, 633.

The locally oscillated light 611 emitted from the semiconductor laser 200 is introduced into the input-side optical waveguide 630 among the integrally-formed optical waveguides. The light is then branched into two by the optical branching element 620 to be introduced into the output-side optical waveguides 631 and 633.

On the other hand, the transmitted signal light 612 is introduced into the input-side optical waveguide 632. The light is then branched into two by the optical branching element 620 to be introduced into the output-side optical waveguides 631 and 633. As a result, the locally oscillated light 611 and the signal light 612 are combined in the output-side optical waveguides 631 and 633, so as to obtain beat signals.

Figure 7A:
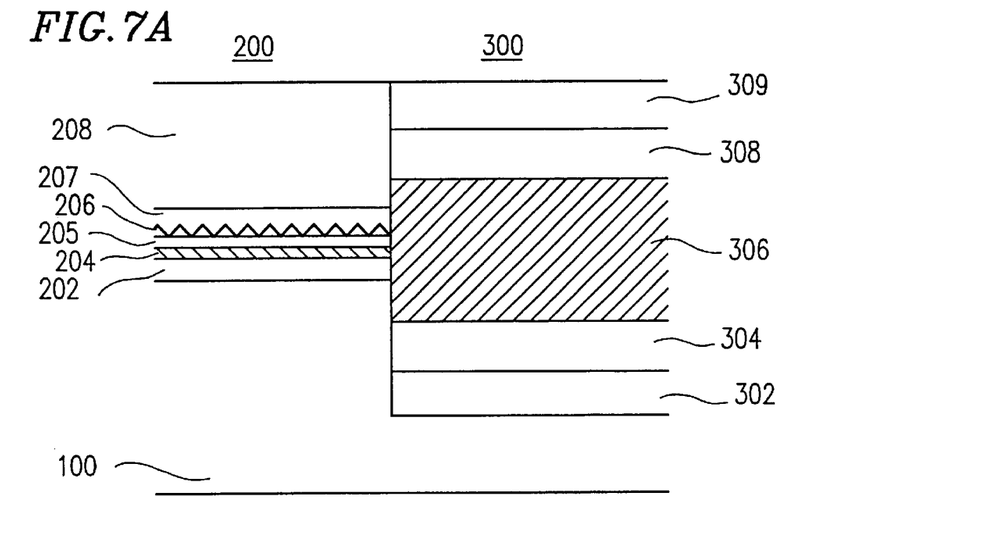
FIGS. 7A and 7B are sectional views illustrating an ideal configuration and an actual configuration, respectively, when a semiconductor laser and an optical waveguide are integrally formed on the same substrate.

In the fabrication of the waveguide type optical integrated circuit element with the above configuration, it is required to form the semiconductor laser and the optical waveguide integrally on a same substrate. One example of the method for realizing this integration is an abutting method as shown in FIG. 7A. Referring to FIG. 7A, which shows an ideal integration by the abutting method, a distributed feedback (DFB) type semiconductor laser 200 formed on a semiconductor substrate 100 is vertically etched to remove part thereof, and an optical waveguide structure 300 is formed in the etched area. The optical waveguide structure 300 includes an optical waveguide layer 306, optical confinement layers 304 and 308 sandwiching the optical waveguide layer 306, a buffer layer 302, and a capping layer 309 located on the outer sides of the optical confinement layers 304 and 308, respectively. The semiconductor laser 200 includes a first cladding layer 202, an active layer 204, a carrier barrier layer 205, a first guiding layer 206, a second guiding layer 207, and a second cladding layer 208. Light emitted from the semiconductor laser 200 is directly coupled with the optical waveguide structure 300, and propagates in the optical waveguide layer 306.

The abutting method described above eliminates the necessity of positioning the semiconductor laser and the optical waveguide with each other, thereby providing high mechanical stability, compared with a method where they are separately fabricated and then bonded together.

The above conventional method is disadvantageous in the following points.

Figure 7B:
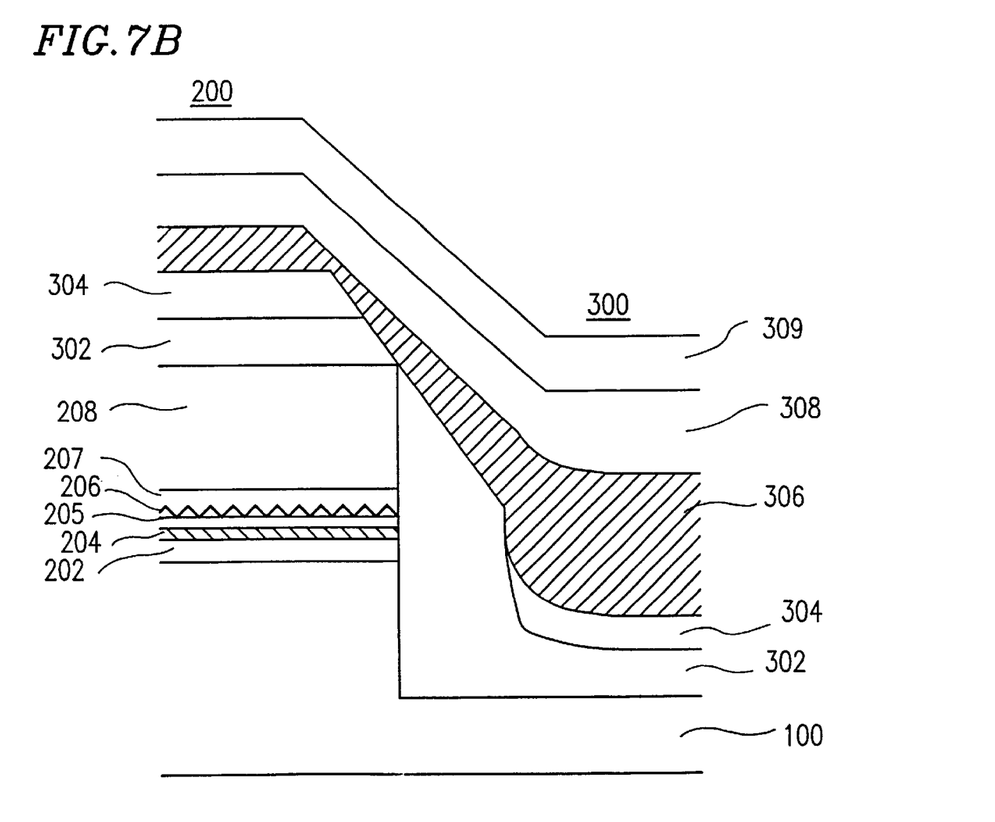

(1) In reality, the optical waveguide structure is not formed as ideally shown in FIG. 7A in the area formed by the vertical etching, but is formed as shown in FIG. 7B, for example. That is, the optical waveguide layer 306 of the optical waveguide structure 300 is slanted from the horizontal direction in the interface area with the semiconductor laser 200. In such a slant layer area, since light is influenced by the refractive index distribution in the area, the percentage of light which is not coupled with the optical waveguide layer 306 increases. Thus, the coupling ratio is much lower than that anticipated from the ideal configuration.

(2) When the vertical beam diameter of light emitted from the semiconductor laser 200 does not match with the vertical beam diameter in a native mode of the optical waveguide structure 300, the greater the difference therebetween, the lower the percentage of light emitted from the semiconductor laser 200 which is coupled with the optical waveguide structure 300 becomes.

The above problems (1) and (2) will be described more specifically.

FIG. 7B shows the case where a GaAs/AlGaAs DFB semiconductor laser is vertically etched and then AlGaAs materials are grown in the etched area by metal organic chemical vapor deposition (MOCVD) to form the optical waveguide structure 300.

In the process of the growth of the AlGaAs materials, since the growth rate greatly depends on the plane orientation, a plane with a lower growth rate grows more slowly than a plane with a higher growth rate, resulting in the structure as shown in FIG. 7B. In this case, a slant layer structure slanted from the horizontal direction is formed at the interface between the semiconductor laser 200 and the optical waveguide structure 300. Accordingly, part of light emitted from the semiconductor laser 200 is reflected or refracted by the slant layer structure at the interface, thereby to be radiated outside the optical waveguide structure, not coupled with the optical waveguide layer 306. In other words, radiation loss occurs.

It has been confirmed from the results of experiments conducted by the inventors of the present invention that light of about 1 dB was radiated by the slant layer structure at the interface. The inventors fabricated various types of the optical waveguide structure under various different conditions. The resultant configurations of the optical waveguide structures varied depending on the conditions, but it was not possible to obtain the ideal configuration as shown in FIG. 7A. In any case, a radiation loss in the range of 0.5 to 1 dB was observed.

Moreover, in the conventional case, the thickness of the optical waveguide layer 306 of the optical waveguide structure 300 was about 2 μm while the vertical beam diameter of the semiconductor laser 200 was about 1 μm. This difference caused a great mode mismatch when light emitted from the semiconductor laser 200 was coupled with the optical waveguide layer 300. Due to this mode mismatch, a radiation loss of 1.7 dB was observed.

Thus, the total radiation loss amounts to about 2.7 dB. Due to this radiation loss, the semiconductor laser 200 is forced to provide a light output higher than that actually required. As a result, the power consumption of the semiconductor laser 200 increases, and moreover the reliability of the semiconductor laser 200 is reduced.

SUMMARY OF THE INVENTION

The waveguide type optical integrated circuit element of this invention includes: a semiconductor laser of an end face output type; and an optical waveguide for propagating output light from the semiconductor laser, the optical waveguide including a plurality of semiconductor layers, the semiconductor laser and the optical waveguide being integrally formed side by side on a semiconductor substrate, wherein a single semiconductor layer is buried in an interface area between the semiconductor laser and the optical waveguide.

In one embodiment of the invention, the single semiconductor layer has a width of about 20 μm.

Alternatively, the waveguide type optical integrated circuit element of this invention includes: a semiconductor laser of an end face output type; and an optical waveguide for propagating output light from the semiconductor laser, the optical waveguide including a plurality of semiconductor layers, the semiconductor laser and the optical waveguide being integrally formed side by side on a semiconductor substrate, wherein a semiconductor layer of which the refractive index is substantially continuously changed in a thickness direction is buried in an interface area between the semiconductor laser and the optical waveguide.

In one embodiment of the invention, the refractive index of the semiconductor layer changes parabolically where the refractive index is higher at a position closer to the center of the semiconductor layer in the thickness direction.

In another embodiment of the invention, the refractive index is changed by changing the composition of the semiconductor layer.

In still another embodiment of the invention, the center of the semiconductor layer in the thickness direction matches with the center of an output light distribution of the semiconductor laser and the center in a native mode of the optical waveguide.

In still another embodiment of the invention, a single semiconductor layer is buried at at least one of an interface between the semiconductor layer and the semiconductor laser and an interface between the semiconductor layer and the optical waveguide.

Alternatively, the waveguide type optical integrated circuit element of this invention includes: a semiconductor laser of an end face output type; and an optical waveguide for propagating output light from the semiconductor laser, the optical waveguide including a plurality of semiconductor layers, the semiconductor laser and the optical waveguide being integrally formed side by side on a semiconductor substrate, wherein a dielectric layer is formed in an interface area between the semiconductor laser and the optical waveguide.

In one embodiment of the invention, dielectric layers are interposed between the semiconductor layer and the semiconductor laser and between the semiconductor layer and the optical waveguide.

In another embodiment of the invention, the semiconductor laser is a distributed feedback type semiconductor laser.

According to another aspect of the invention, a method for fabricating a waveguide type optical integrated circuit element is provided. The method includes the steps of: forming a semiconductor layer constituting a semiconductor laser on a semiconductor substrate; removing a portion of the semiconductor layer corresponding to a first region by etching so as to have a substantially vertical section; forming a semiconductor layer constituting an optical waveguide in the first region; removing a portion including an interface between a light output end face of the semiconductor laser and a light incident face of the optical waveguide corresponding to a second region by etching so as to have a substantially vertical section; and forming a single semiconductor layer in the second region.

Alternatively, the method for fabricating a waveguide type optical integrated circuit element of this invention includes the steps of: forming a semiconductor layer constituting a semiconductor laser on a semiconductor substrate; removing a portion of the semiconductor layer corresponding to a first region by etching so as to have a substantially vertical section; forming a semiconductor layer constituting an optical waveguide in the first region; removing a portion including an interface between a light output end face of the semiconductor laser and a light incident face of the optical waveguide corresponding to a second region by etching so as to have a substantially vertical section; and forming a semiconductor layer of which the refractive index is substantially continuously changed in a thickness direction in the second region.

Alternatively, the method for fabricating a waveguide type optical integrated circuit element of this invention includes the steps of: forming a semiconductor layer constituting a semiconductor laser on a semiconductor substrate; removing a portion of the semiconductor layer corresponding to a first region by etching so as to have a substantially vertical section; forming a dielectric mask on the section of the semiconductor layer; and forming a plurality of semiconductor layers constituting an optical waveguide in the first region.

In one embodiment of the invention, the step of forming a dielectric mask includes employing a bias sputtering method where sputtering is performed at the same time when a bias voltage is being applied to the semiconductor substrate.

Alternatively, the method for fabricating the waveguide type optical integrated circuit element includes the step of:

matching the center of the semiconductor layer in the thickness direction with the center of the output light distribution of the semiconductor laser and the center in the native mode of the optical waveguide by controlling the flow obtained by a mass flow controller of an MOCVD apparatus.

Thus, according to one embodiment of the waveguide type optical integrated circuit element of the present invention, a single semiconductor layer is buried in the interface area between the semiconductor laser and the optical waveguide. Accordingly, a slant layer structure does not exist in the interface area.

This makes it possible to reduce the difference in the equivalent refractive index at the interface between the semiconductor laser and the buried region and at the interface between the buried region and the optical waveguide. At such interfaces, the propagating light is hardly reflected nor refracted, allowing for a reduction in the radiation loss.

Moreover, with the above configuration, the beam diameter of the output light from the semiconductor laser can be easily matched with the beam diameter in the native mode of the optical waveguide. This suppresses the radiation loss due to the mode mismatch.

Thus, according to the present invention, since the coupling loss can be greatly reduced, a waveguide type optical integrated circuit element with reduced power consumption and improved reliability can be realized.

In another embodiment of the invention, a semiconductor layer of which refractive index is substantially continuously changed in the thickness direction is buried in the interface area between the semiconductor laser and the optical waveguide. Accordingly, the mode profile of light propagating in the semiconductor layer continuously changes due to the lens effect of the semiconductor layer, so that the light is coupled with the optical waveguide when the mode profile matches with the beam diameter in the native mode of the optical waveguide. Thus, the coupling loss due to the mode mismatch can be more effectively reduced.

When the above two configurations are combined, the effects of the two configurations can be synergically obtained to provide a waveguide type optical integrated circuit element which can effectively reduce the coupling loss further.

In still another embodiment of the invention, a dielectric layer is formed in the interface area between the semiconductor laser and the optical waveguide. Also with this configuration, a waveguide type optical integrated circuit element which does not include a slant layer structure in the interface area is realized. Thus, the coupling loss can be reduced.

In still another embodiment of the invention, a dielectric layer is formed in the interface area between the semiconductor laser and the optical waveguide, and a semiconductor layer where the refractive index is substantially continuously changed in the thickness direction is buried in the interface area between the semiconductor laser and the optical waveguide. With this configuration, the slanted growth of the semiconductor layers is prevented, and the mode mismatch is eliminated. By obtaining these effects synergically, a waveguide type optical integrated circuit element which can greatly reduce the coupling loss is realized.

Thus, the invention described herein makes possible the advantages of (1) providing a waveguide type optical integrated circuit element which can minimize light loss at the interface between a semiconductor laser and an optical waveguide, thereby reducing the power consumption and improving the reliability, and (2) providing a method for fabricating such a waveguide type optical integrated circuit element.

These and other advantages of the present invention will become apparent to those skilled in the art upon reading and understanding the following detailed description with reference to the accompanying figures.

DESCRIPTION OF THE PREFERRED EMBODIMENTS

Hereinbelow, the present invention will be described by way of example with reference to the accompanying drawings.

Example 1

FIGS. 1A to 1F illustrate the steps of fabricating a waveguide type optical integrated circuit element of Example 1 according to the present invention. In this example, the present invention is applied to a waveguide type optical integrated circuit element including a semiconductor laser of a general double-hetero (DH) structure. The configuration of the waveguide type optical integrated circuit element of this example will be described together with the fabrication process thereof.

Figure 1A:
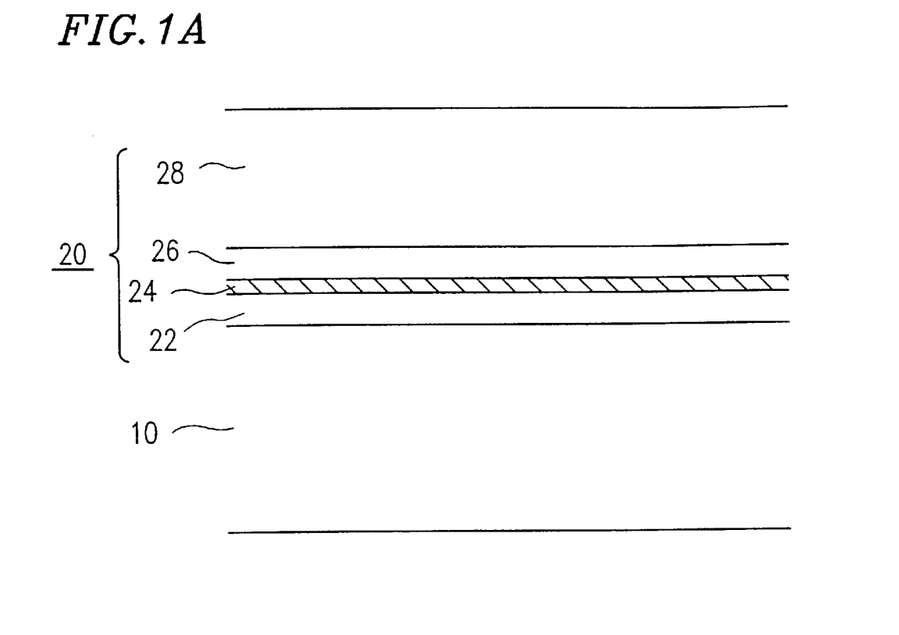
FIGS. 1A to 1F are sectional views illustrating the steps of fabricating a waveguide type optical integrated circuit element of Example 1 according to the present invention.

First, as shown in FIG. 1A, A GaAs substrate (wafer) 10 was placed in an MOCVD apparatus, and semiconductor layers constituting an AlGaAs semiconductor laser 20 were grown on the GaAs substrate 10 by MOCVD. The semiconductor laser 20 in this example is of a general double-hetero (DH) structure having a vertical beam diameter of about 1 μm. The semiconductor layers constituting the semiconductor laser 20 include a first cladding layer 22, an active layer 24, a second cladding layer 26, and a contact layer 28. The active layer 24 was grown to have an Al mole fraction of 0.14 and realize an oscillation wavelength of 780 nm.

Figure 1B:
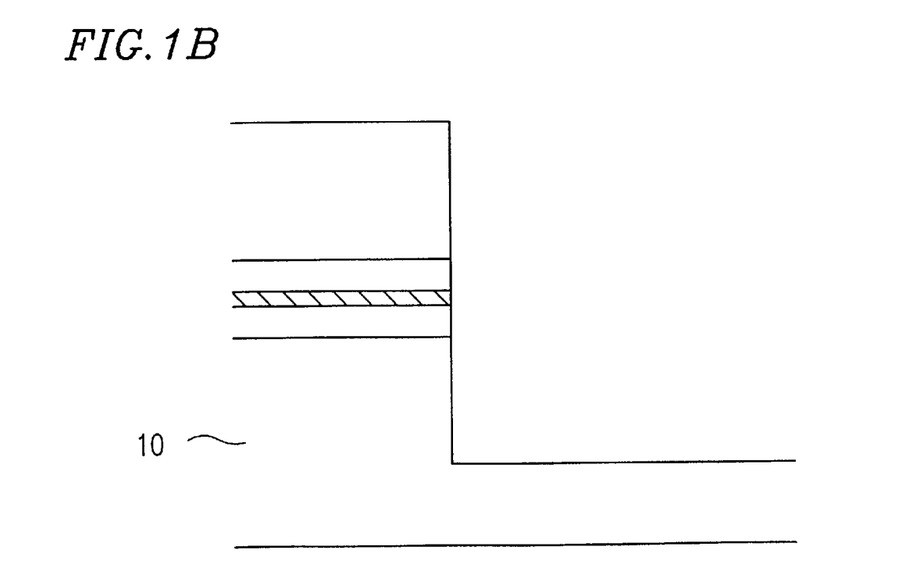

Then, as shown in FIG. 1B, the resultant wafer with the above semiconductor layers formed thereon was taken out from the MOCVD apparatus, and partly etched vertically to a depth reaching the GaAs substrate 10 by reactive ion beam etching (RIBE) using chlorine gas.

Figure 1C:
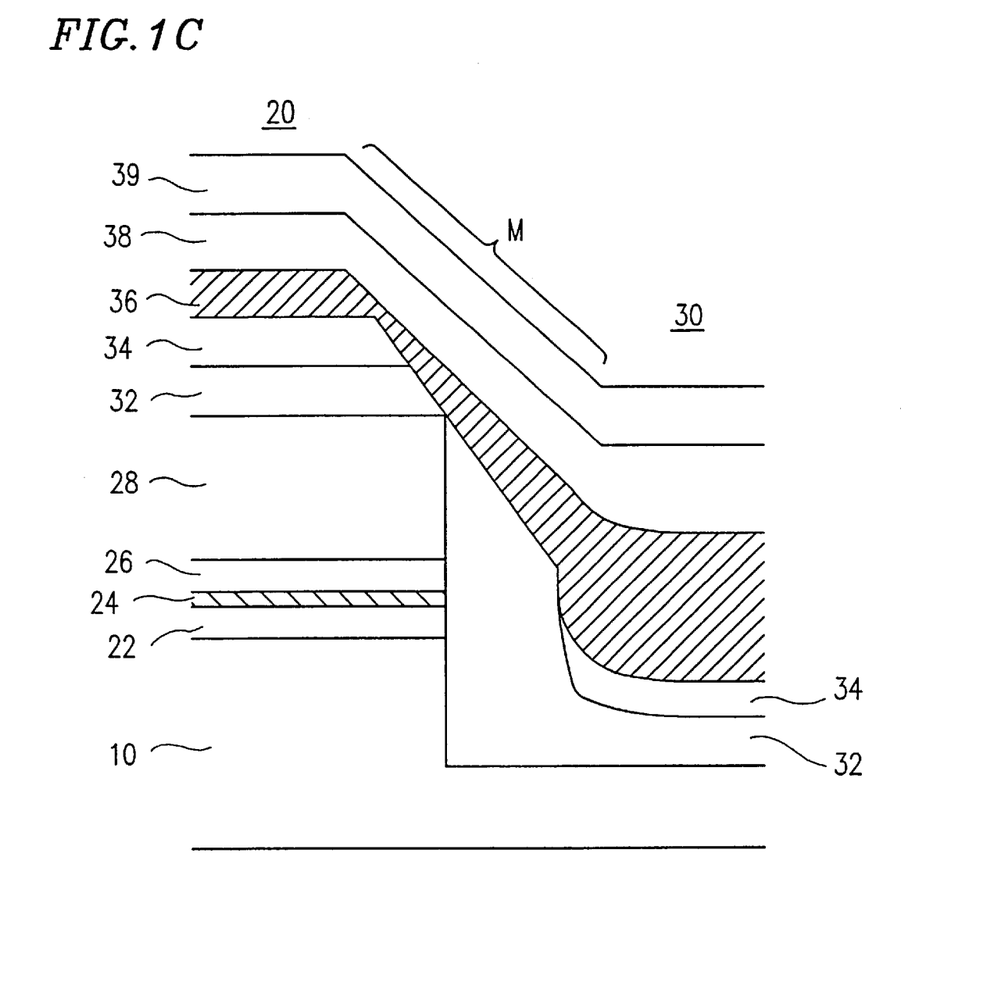

Thereafter, the resultant wafer was returned to the MOCVD apparatus, and, as shown in FIG. 1C, semiconductor layers constituting an optical waveguide 30 were grown by MOCVD. The semiconductor layers include an optical waveguide layer 36, optical confinement layers 34 and 38 sandwiching the optical waveguide layer 36, and buffer layers 32 and 39.

The optical waveguide layer 36 has an Al mole fraction of 0.2 and a thickness of 2 μm. The optical confinement layers 34 and 38 have an Al mole fraction of 0.22 and a thickness of 1 μm.

The optical waveguide 30 is transparent to output light (780 nm) of the semiconductor laser 20 and serves as a low-loss waveguide. The controllability of the etching depth was about 2%, and the controllability of the thicknesses of the semiconductor layers grown subsequently by MOCVD was about 1%. With these controllabilities, it was possible to match the center of the output light distribution of the semiconductor laser 20 with the height of the center in the native mode of the optical waveguide 30 at the position where the semiconductor layers of the optical waveguide 30 are horizontal with a precision of 0.1 μm.

Figure 1D:
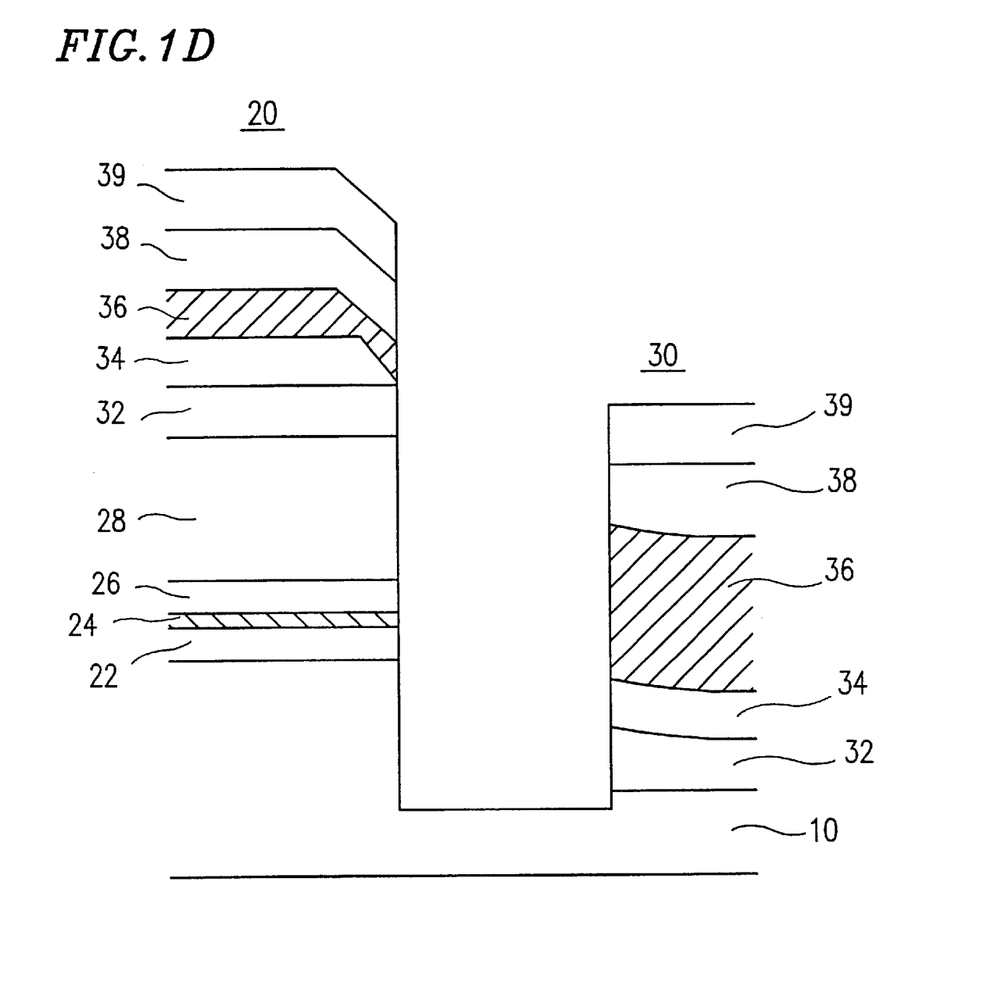

Thereafter, as shown in FIG. 1D, the interface area between the semiconductor laser 20 and the optical waveguide 30 was vertically etched over a width of 2 μm. The etching depth is not required to be precisely controlled. The only requirement is that the etching should penetrate through the entire optical waveguide 30. The RIBE method was also employed for this etching.

As shown in FIG. 1C, the semiconductor layers of the optical waveguide 30 were grown slanted from the horizontal direction in the area near the interface with the semiconductor laser 20 as in the conventional case. However, such slant layers are less influential at a position farther from the interface with the semiconductor laser 20 and become substantially horizontal at a position about 3 μm or more, apart from the interface. In this example, such a slant layer area was etched as described above.

Figure 1E:
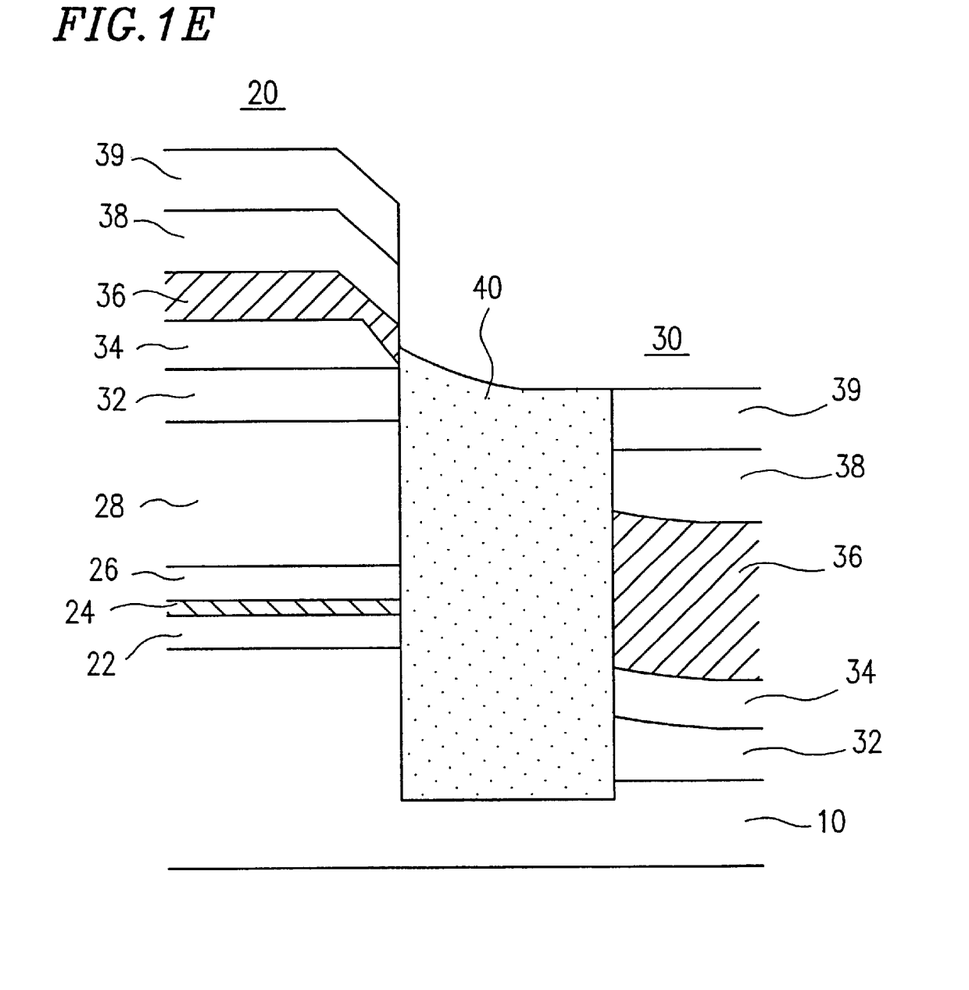

Subsequently, as shown in FIG. 1E, an AlGaAs buried region 40 having an Al mole fraction of 0.2 was grown in the etched area by MOCVD.

Figure 1F:
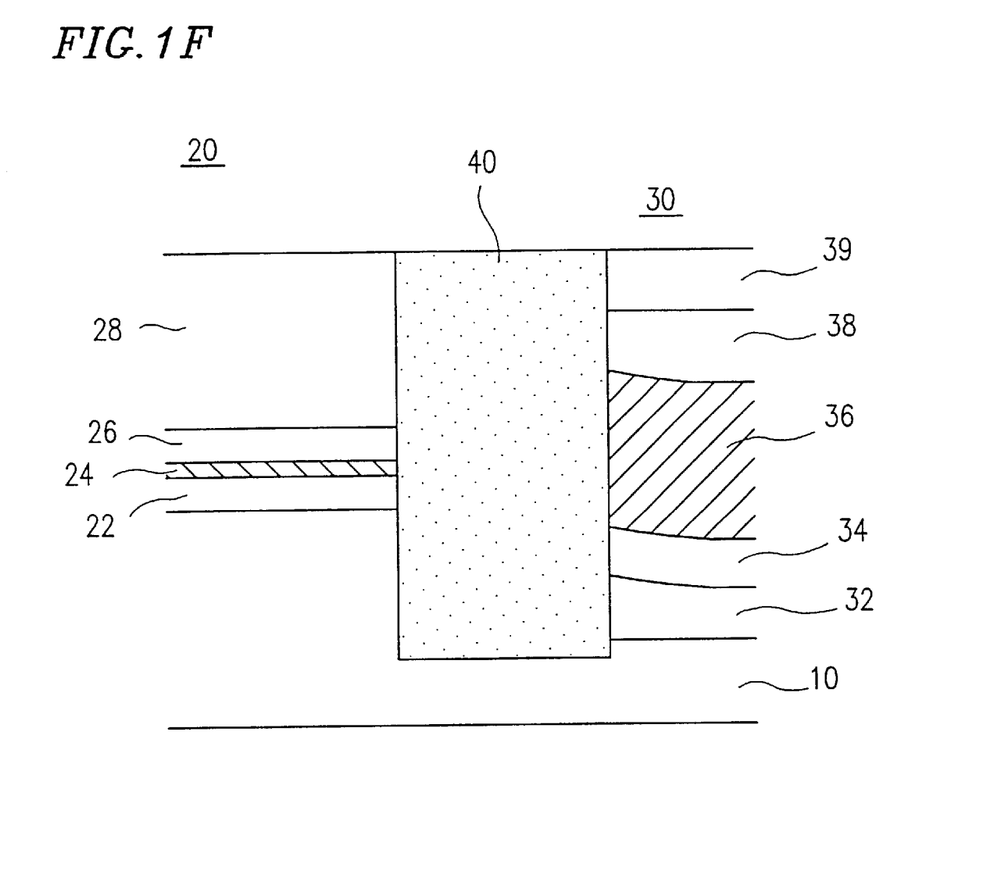

Finally, the portion of the semiconductor layers for the optical waveguide and the portion of the semiconductor layer for the buried layer grown on the semiconductor laser 20 were removed as shown in FIG. 1F. The resultant structure was processed into a ridge shape, to realize transverse light confinement. Subsequent steps such as electrode formation and cleaving are then performed, to obtain the waveguide type optical integrated circuit element of this example.

The resultant waveguide type optical integrated circuit element of this example is substantially free from the slant layer structure (portion M in FIG. 1C), and thus no great coupling loss due to radiation loss was observed unlike the conventional case. In the waveguide type optical integrated circuit element of this example, light emitted from the semiconductor laser 20 is not substantially reflected at the interface between the semiconductor laser 20 and the buried region 40 or at the interface between the buried region 40 and the optical waveguide 30. This is because the difference in the equivalent refractive indices is small at these interfaces. As a result, the semiconductor laser exhibited good operation in an external resonator mode where the entire of the semiconductor laser 20, the buried region 40, and the optical waveguide 30 are considered as a resonator.

In the waveguide type optical integrated circuit element of this example, the buried region formed at the last stage is not provided with a longitudinal optical confinement structure. However, since the width of the buried region is as small as about 2 μm, the amount of light radiated from the buried region is negligibly small. In the actual evaluation of the optical characteristics of the waveguide type optical integrated circuit element of Example 1, only a coupling loss of 0.7 dB due to the mode mismatch was observed. It was therefore confirmed that the coupling loss could be greatly reduced compared with the conventional case.

The coupling loss was also examined by varying the width of the buried region 40. As a result, no significant coupling loss was observed when the width of the buried region 40 is about 15 μm or less. As the width exceeded 15 μm, the coupling loss became more significant. When the width was 20 μm, a coupling loss of about 1 dB was observed. Although the allowance of the width of the buried region 40 varies depending on the allowable amount of coupling loss, it was confirmed that, when the width of the buried region 40 was set at 20 μm or less, the coupling loss could be suppressed to 1 dB or less, thereby providing desirable characteristics.

Example 2

Figure 2A:
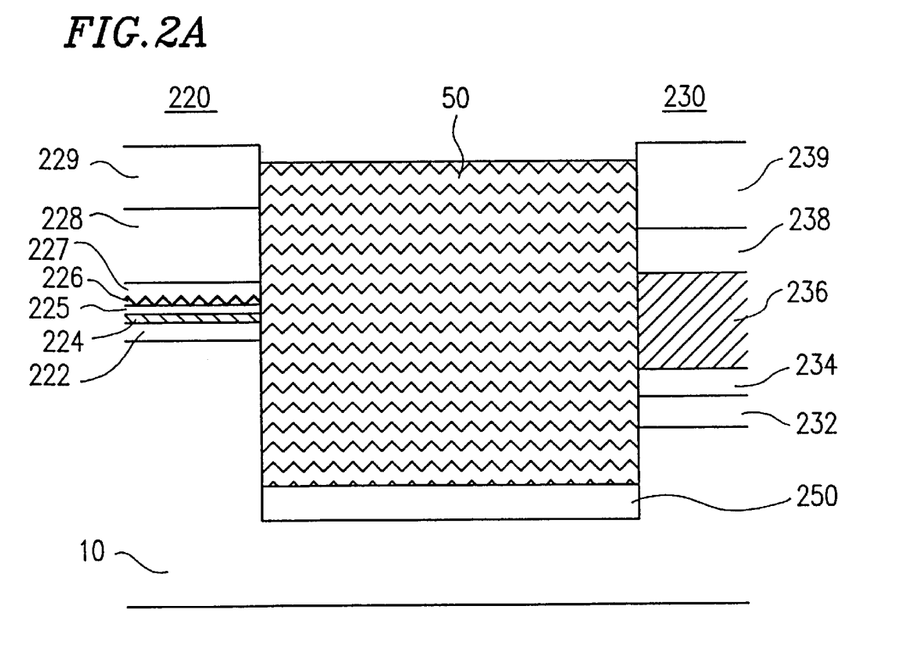
FIG. 2A is a sectional view of a waveguide type optical integrated circuit element of Example 2 according to the present invention.
Figure 2B:
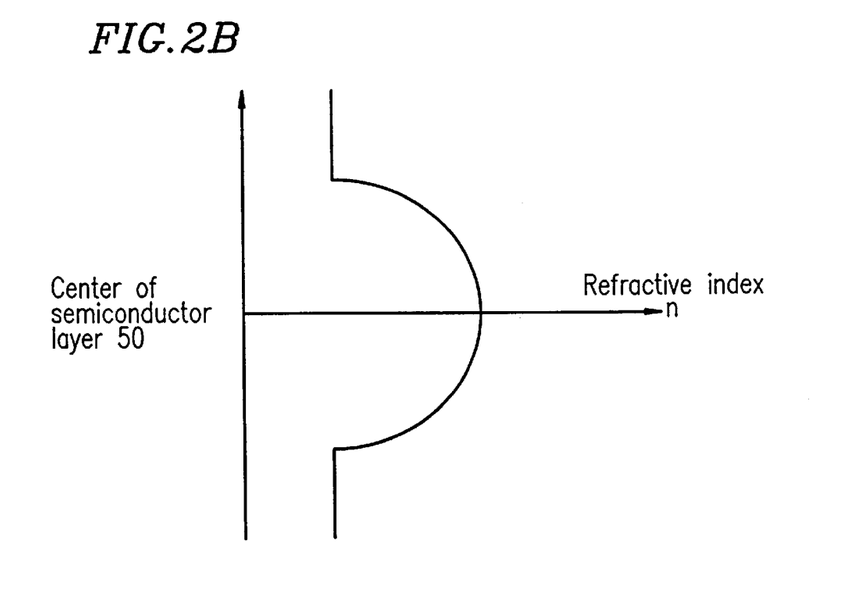
FIG. 2B is a conceptual view illustrating the refractive index distribution in a GRIN region.

FIGS. 2A and 2B show a waveguide type optical integrated circuit element according to the present invention. In this example, the present invention is applied to a waveguide type optical integrated circuit element including a gain coupling type semiconductor laser having an absorption coupling type diffraction grating.

The configuration of the waveguide type optical integrated circuit element of this example will be described together with the fabrication process thereof. In this example, the material to be buried between the semiconductor laser and the optical waveguide is different from that in Example 1, though the fabrication method is similar to that in Example 1.

First, semiconductor layers constituting an AlGaAs DFB semiconductor laser 220 were grown on a GaAs substrate 10 by molecular beam epitaxy (MBE). The semiconductor layers include a first cladding layer 222, an active layer 224, a carrier barrier layer 225, an absorptive grating layer 226, a guiding layer 227, a second cladding layer 228, and a contact layer 229. The semiconductor laser 220 is a gain coupling type semiconductor laser having an absorption coupling type diffraction grating. This type of semiconductor laser is described, for example, in Y. Nakano et al., Japanese Journal of Applied Physics, Vol. 32, No. 2 (1993), pp. 825–829. The detailed description thereof is therefore omitted here.

The semiconductor laser 220 has a vertical beam diameter of about 1 μm, as in Example 1. A three-layered quantum well structure was used for the active layer 224, and the oscillation wavelength was set at 830 nm.

The resultant semiconductor layers were vertically etched to a depth reaching the GaAs substrate 10 by chemically assisted ion beam etching (CAIBE) where chlorine ions (or argon ions) are applied at the same time when chlorine gas is directly being applied to the GaAs substrate 10. This etching is described in detail in H. Kawanishi et al., Japanese Journal of Applied Physics, Vol. 35, No. 7B (1996), pp. 880–882. The specific description thereof is therefore omitted here.

Thereafter, semiconductor layers constituting an optical waveguide 230 were grown by MOCVD. The semiconductor layers include an optical waveguide layer 236, optical confinement layers 234 and 238 sandwiching the optical waveguide layer 236, and a buffer layer layer 232 and a capping layer 239. In Example 2, these semiconductor layers were selectively grown using a mask of silicon oxide so that they are not grown on the semiconductor laser 220.

The semiconductor layers grown were observed slanted from the horizontal direction in section in the area near the interface with the semiconductor laser 220 as in the conventional case. The thickness of the optical waveguide layer 236 was 2 $\mu$m. In this example, as in Example 1, it was possible to match the center of the output light distribution of the semiconductor laser 220 with the height of the center in the native mode of the optical waveguide 230 at the position where the semiconductor layers of the optical waveguide 230 are horizontal with a precision of 0.1 $\mu$m.

Then, the interface area between the semiconductor laser 220 and the optical waveguide 230 was vertically etched over a width of about 7.8 $\mu$m. The etching depth was controlled to be 7.0 $\mu$m so that the etching penetrated through the entire optical waveguide 230.

Subsequently, a buffer layer 250 and a semiconductor layer 50 were grown in the etched area. The semiconductor layer 50 includes a structure where the refractive index n is continuously varied, or graded (hereinbelow, the semiconductor layer 50 is referred to as the graded index (GRIN) region). FIG. 2B shows the refractive index distribution in the thickness direction of the GRIN region 50. As is observed from FIG. 2B, the refractive index distribution exhibits a parabolical change where the refractive index is larger at a position in the GRIN region 50 closer to the center thereof in the thickness direction. Such a refractive index distribution was realized using the change in the Al mole fraction.

The thickness of the GRIN region 50 was set at about 2.9 $\mu$m for one half (from the center to one surface). The refractive index at the center (maximum) was about 3.6 while the refractive index at the surface (minimum) was about 3.2. The center of the GRIN region 50 was positioned to match with the center of the output light distribution of the semiconductor laser 220 and the height of the center in the native mode of the optical waveguide 230. This positioning control was easily accomplished by computer-assisted control of the flow obtained by a mass flow controller of the MOCVD apparatus.

Thereafter, a groove with a width of 2 $\mu$m defining the waveguide area was formed by etching over the semiconductor laser 220, the GRIN region 50, and the optical waveguide 230. The groove was made deep enough to penetrate all the semiconductor layers.

Finally, a semiconductor layer (not shown) was buried in the etched groove to form a buried waveguide structure. Thus, the waveguide type optical integrated circuit element of Example 2 as a transverse mode confinement structure was obtained.

In the waveguide type optical integrated circuit element of Example 2, the semiconductor laser 220 is a DFB laser which oscillates even if no reflection is obtained at the interface between the semiconductor laser 220 and the GRIN region 50. Accordingly, the semiconductor laser 220 exhibited good oscillation independently. It is therefore desirable to use the DFB laser which operates by itself as a light source when a device such as an optical branching element is integrally formed with the optical waveguide 230.

The coupling loss between the semiconductor laser 220 and the optical waveguide 230 of the waveguide type optical integrated circuit element of Example 2 was measured and found to be about 0.4 dB. Out of this value, about 0.2 dB is estimated to be the coupling loss due to the slanted growth of the GRIN region 50. It was therefore confirmed that the coupling loss due to the mode mismatch could be greatly reduced due to the formation of the GRIN region 50.

The reason why the coupling loss was greatly reduced is that the mode profile of light propagating in the GRIN region 50 continuously changes due to the lens effect of the GRIN region 50, so that the light is coupled with the optical waveguide 230 when the mode profile matches with the beam diameter in the native mode of the optical waveguide 230. Actually, the change of the coupling loss was examined by varying the length of the GRIN region 50. As a result, it was confirmed that the coupling loss changed periodically as the length of the GRIN region 50 varied. Accordingly, the length of the GRIN region 50 should preferably be optimized based on the beam diameter in the native mode of the optical waveguide 230.

In Example 2, the parabolic function was used for the refractive index distribution in the GRIN region 50. Alternatively, other types of refractive index distribution may also be used so long as the substantially the same lens effect can be provided. In Example 2, the refractive index changed continuously in a parabolic manner. Similar characteristics can also be obtained by approximating this change by a straight-line function.

Example 3

Figure 3:
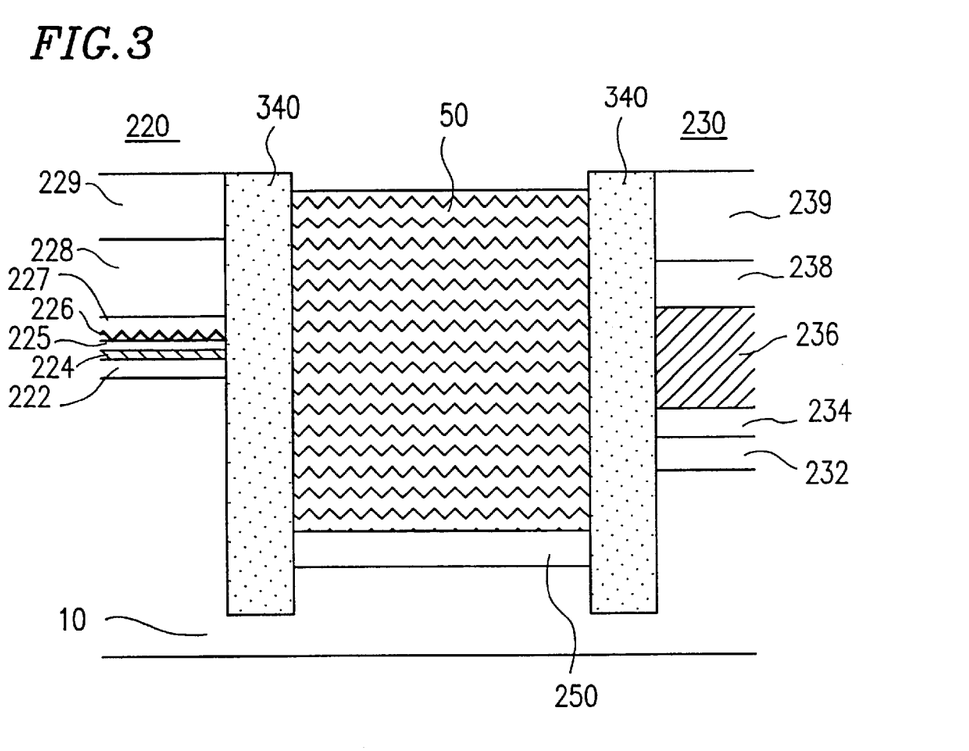
FIG. 3 is a sectional view of a waveguide type optical integrated circuit element of Example 3 according to the present invention.

FIG. 3 shows a waveguide type optical integrated circuit element of Example 3 according to the present invention. The waveguide type optical integrated circuit element of this example is fabricated by combining the fabrication methods in Examples 1 and 2. In FIG. 3, components corresponding to those in Examples 1 and 2 are denoted by the same reference numerals.

In order to reduce the coupling loss due to the slanted growth of the GRIN layer, the interface area between the semiconductor laser 220 and a GRIN region 50 or the interface area between the GRIN region 50 and the optical waveguide 230, or both are etched. The etched areas are filled with a single layer (having a composition similar to that of the buried layer 40 in FIG. 1F). In this way, the effect in Example 1 is added to the effect in Example 2.

Since only substantially vertical etching is required in the above etching process, a general etching method can be employed. For example, reactive ion etching (RIE) or wet etching may be employed. As for the crystal growth, not only the MOCVD method and the MBE method described above, but also a liquid phase epitaxy method, a chloride VPE method, and the like may be employed, as required.

Example 4

Figure 4A:
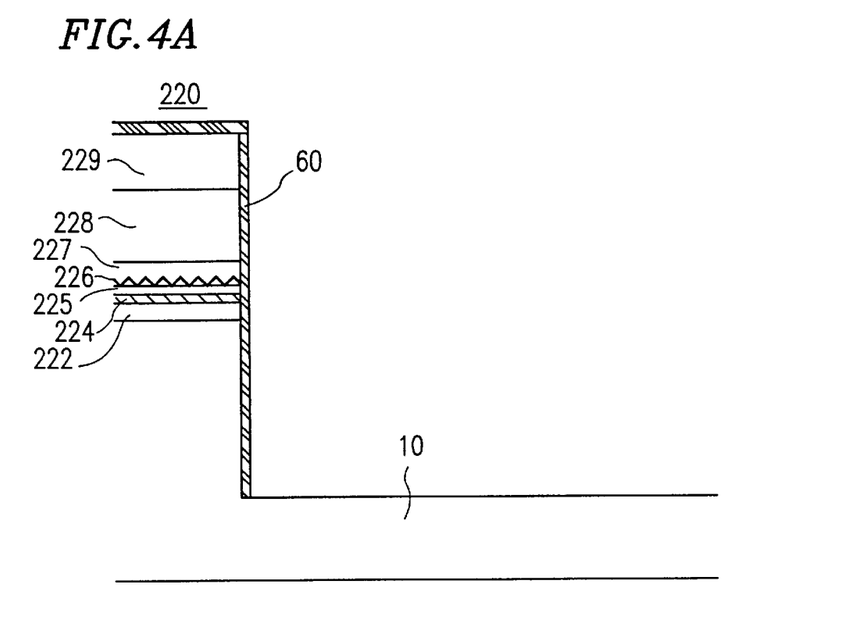
FIGS. 4A and 4B are sectional views illustrating the steps of fabricating a waveguide type optical integrated circuit element of Example 4 according to the present invention.
Figure 4B:
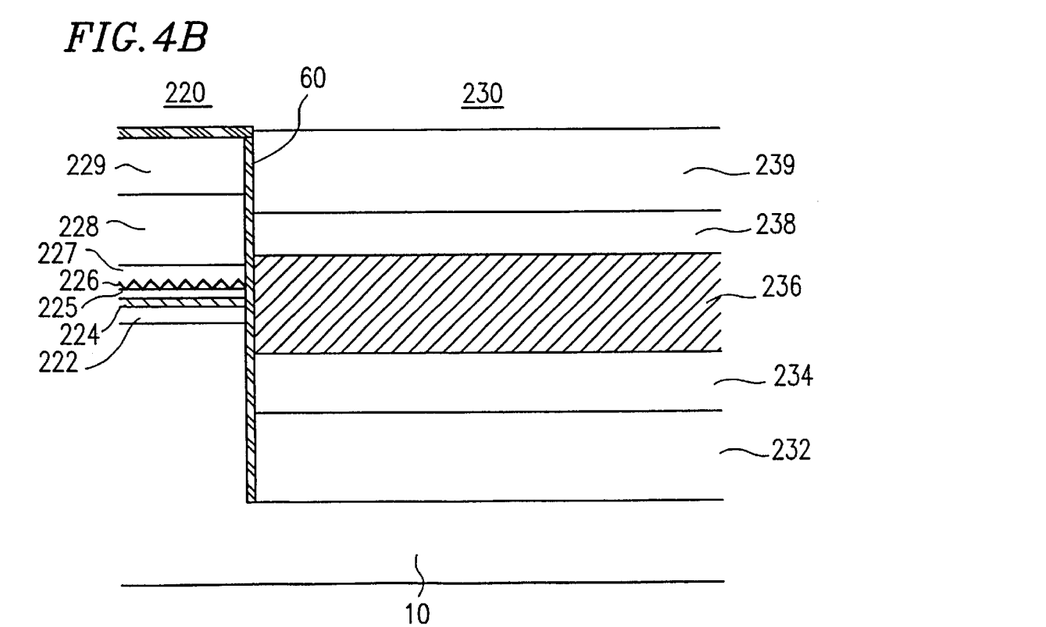

FIGS. 4A and 4B show a waveguide type optical integrated circuit element of Example 4 according to the present invention. The configuration of the waveguide type optical integrated circuit element of this example will be described together with the fabrication process thereof.

First, semiconductor layers constituting an AlGaAs DFB semiconductor laser 220 were grown on a GaAs substrate 10 by MBE. The configuration of the semiconductor laser 220 is the same as that shown in FIG. 2A. In this example, the semiconductor laser 220 is a gain coupling type semiconductor laser having an absorption coupling type diffraction grating.

The semiconductor laser 220 has a vertical beam diameter of about 1 $\mu$m. A three-layered quantum well structure was used for the active layer 224, and the oscillation wavelength was set at 780 nm.

The resultant structure was vertically etched to a depth reaching the GaAs substrate 10 by RIBE using a mask of silicon oxide.

Then, a silicon oxide film 60 was formed on the side wall of the etched area by a bias sputtering method where the sputtering is performed at the same time when a bias voltage is being applied to the GaAs substrate 10. Using this method, silicon oxide was not deposited on the bottom surface of the etched area, but deposited only on the side wall and top of the semiconductor laser 220 forming the silicon oxide film 60. The thickness of the silicon oxide film 60 was set at about 20 nm. The silicon oxide film 60 with such a small thickness does not reflect incident light.

At that stage, the silicon oxide film 60 had been formed on the side wall of the etched area, as well as on the non-etched portion of the semiconductor laser 220, but had not been formed on the bottom surface of the etched area. Subsequently, semiconductor layers constituting an optical waveguide 230 were selectively grown by MOCVD using the silicon oxide film 60 as a mask. Thus, these semiconductor layers were not grown on the semiconductor laser 220.

Thus, in Example 4, since the silicon oxide film 60 as the dielectric layer had been formed on the side wall of the etched area, at the subsequent growth of the semiconductor layers, growth in the direction substantially perpendicular to the side wall of the etched area was suppressed. This effectively prevented the semiconductor layers from growing in a direction slanted from the horizontal direction, and allowed the semiconductor layers to grow as layers horizontal to the GaAs substrate 10. The thickness of the optical waveguide layer 236 was about 2 $\mu$m.

In the waveguide type optical integrated circuit element of Example 4, as in the previous examples, the center of the output light distribution of the semiconductor laser 220 matched with the height of the center in the native mode of the optical waveguide 230.

The coupling loss between the semiconductor laser 220 and the optical waveguide 230 of the waveguide type optical integrated circuit element of Example 4 was measured and found to be about 1.8 dB, which includes only the coupling loss due to the mode mismatch. It was therefore confirmed that the coupling loss could be reduced.

Example 5

Figure 5A:
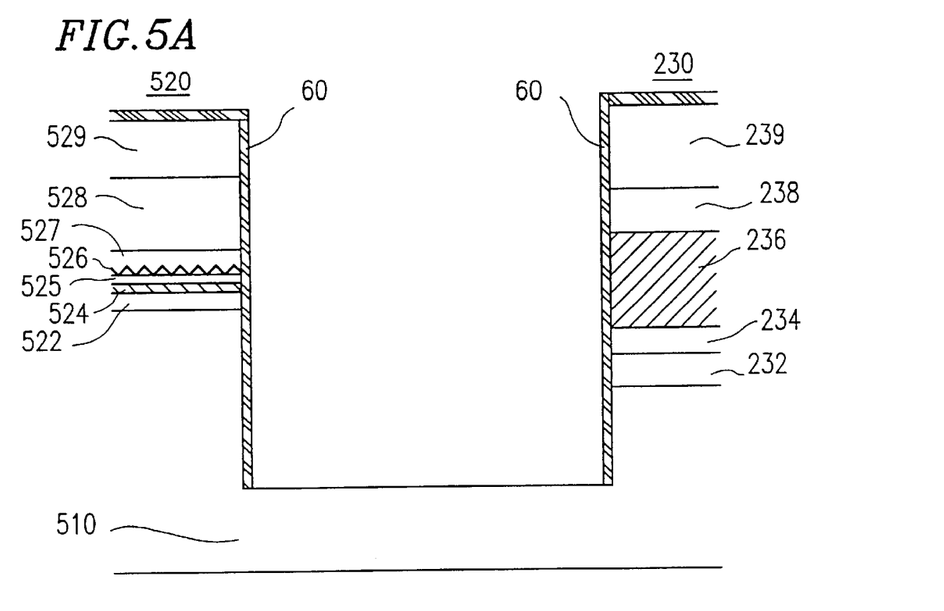
FIGS. 5A and 5B are sectional views illustrating the steps of fabricating a waveguide type optical integrated circuit element of Example 5 according to the present invention.
Figure 5B:
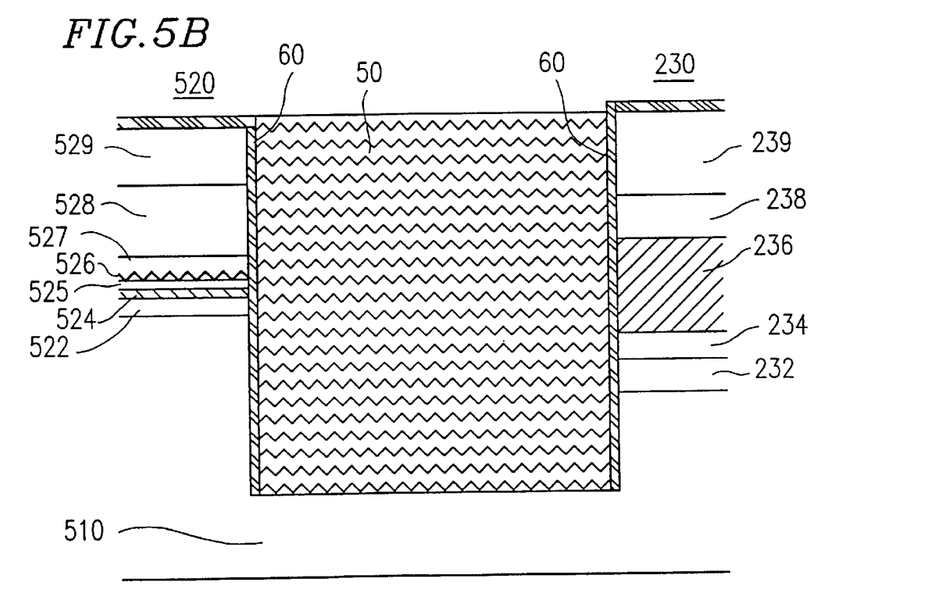

FIGS. 5A and 5B show a waveguide type optical integrated circuit element of Example 5 according to the present invention. The waveguide type optical integrated circuit element of this example is fabricated by combining the fabrication methods in Examples 2 and 4. The configuration of the waveguide type optical integrated circuit element of this example will be described together with the fabrication process thereof.

First, semiconductor layers constituting an InGaAsP DFB semiconductor laser 520 were grown on an InP substrate 510 by MBE. The semiconductor layers include a first cladding layer 522, an active layer 524, a carrier barrier layer 525, an absorptive grating layer 526, a guiding layer 527, a second cladding layer 528, and a contact layer 529. In this example, the semiconductor laser 520 is a gain coupling type semiconductor laser having an absorption coupling type diffraction grating.

The semiconductor laser 520 has a vertical beam diameter of about 1 $\mu$m. A three-layered quantum well structure was used for the active layer 524, and the oscillation wavelength was set at 1.55 $\mu$m.

The resultant structure was vertically etched to a depth reaching the InP substrate 510 by RIBE.

Subsequently, semiconductor layers constituting an optical waveguide 230 were selectively grown by MOCVD using a mask of silicon oxide. The configuration of the optical waveguide 230 is the same as that shown in FIG. 2A. Thus, these semiconductor layers were not grown on the semiconductor laser 520.

The semiconductor layers grown were observed slanted from the horizontal direction in section in the area near the interface with the semiconductor laser 520 as in the conventional case. The thickness of the optical waveguide layer 236 was 1.5 $\mu$m. In this example, as in the previous examples, it was possible to match the center of the output light distribution of the semiconductor laser 520 with the height of the center in the native mode of the optical waveguide 230 at the position where the semiconductor layers of the optical waveguide 230 are horizontal with a precision of 0.1 $\mu$m.

Then, the interface area between the semiconductor laser 520 and the optical waveguide 230 was vertically etched over a width of about 4.2 $\mu$m using a mask of silicon oxide. The etching depth was controlled to be 6.0 $\mu$m so that the etching penetrated through the entire optical waveguide 230.

Subsequently, a silicon oxide film 60 was formed on the side wall of the etched area by the bias sputtering method as in Example 4. Using this method, silicon oxide was not deposited on the bottom surface of the etched area, but was deposited only on the side wall and top of the semiconductor laser 220 forming the silicon oxide film 60. The thickness of the silicon oxide film 60 was set at about 20 nm.

A semiconductor layer (a GRIN region) 50 was then formed in the etched area. In the GRIN region 50, the refractive index n is continuously changed. The refractive index was changed using the change in the In and As mole fractions. The center of the GRIN region 50 was positioned to match with the center of the output light distribution of the semiconductor laser 520 and the height of the center in the native mode of the optical waveguide 230. This positioning control was easily accomplished by computer-assisted control of the flow obtained by a mass flow controller of the MOCVD apparatus.

Thus, in Example 5, since the silicon oxide film 60 as the dielectric layer had been formed on the side wall of the etched area, at subsequent growth of the semiconductor layers, growth in the direction substantially perpendicular to the side wall of the etched area was suppressed. This effectively prevented the GRIN region 50 from growing in a direction slanted from the horizontal direction, and allowed the region to grow horizontal to the InP substrate 510.

The coupling loss between the semiconductor laser 520 and the optical waveguide 230 of the waveguide type optical integrated circuit element of Example 5 was measured and found to be about 0.2 dB. Thus, it was confirmed that the coupling loss could be greatly reduced due to the synergical effect that the slanted growth of the semiconductor layers was prevented and that the mode mismatch was eliminated.

Thus, according to one embodiment of the waveguide type optical integrated circuit element of the present invention, a single semiconductor layer is buried in the interface area between the semiconductor laser and the optical waveguide. Accordingly, a slant layer structure does not exist in the interface area.

This makes it possible to reduce the difference in the equivalent refractive index at the interface between the semiconductor laser and the buried region and at the interface between the buried region and the optical waveguide. At such interfaces, the propagating light is hardly reflected nor refracted, allowing for a reduction in the radiation loss.

Moreover, with the above configuration, the beam diameter of the output light from the semiconductor laser can be easily matched with the beam diameter in the native mode of the optical waveguide. This suppresses radiation loss due to the mode mismatch.

Thus, according to the present invention, since the coupling loss can be greatly reduced, a waveguide type optical integrated circuit element with reduced power consumption and improved reliability can be realized.

In another embodiment of the invention, a semiconductor layer of which the refractive index is substantially continuously changed in the thickness direction is buried in the interface area between the semiconductor laser and the optical waveguide. Accordingly, the mode profile of light propagating in the semiconductor layer continuously changes due to the lens effect of the semiconductor layer, so that the light is coupled with the optical waveguide when the mode profile matches with the beam diameter in the native mode of the optical waveguide. Thus, the coupling loss due to the mode mismatch can be more effectively reduced.

When the above two configurations are combined, the effects of the two configurations can be synergically obtained, to provide a waveguide type optical integrated circuit element which can effectively reduce the coupling loss further.

In still another embodiment of the invention, a dielectric layer is formed in the interface area between the semiconductor laser and the optical waveguide. Also with this configuration, a waveguide type optical integrated circuit element which does not include a slant layer structure in the interface area is realized. Thus, the coupling loss can be reduced.

In still another embodiment of the invention, a dielectric layer is formed in the interface area between the semiconductor laser and the optical waveguide, and a semiconductor layer where the refractive index is substantially continuously changed in the thickness direction is buried in the interface area between the semiconductor laser and the optical waveguide. With this configuration, the slanted growth of the semiconductor layers is prevented, and the mode mismatch is eliminated. By obtaining these effects synergically, a waveguide type optical integrated circuit element which can greatly reduce the coupling loss is realized.

According to the fabrication method of the present invention, the waveguide type optical integrated circuit elements which have the above effects can be easily fabricated.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for fabricating a waveguide type optical integrated circuit element, comprising the steps of:
    forming a semiconductor layer constituting a semiconductor laser on a semiconductor substrate;
    removing a portion of the semiconductor layer corresponding to a first region by etching so as to have a substantially vertical section;
    forming a semiconductor layer constituting an optical waveguide in the first region;
    removing a portion including an interface between a light output end face of the semiconductor laser and a light incident face of the optical waveguide corresponding to a second region by etching so as to have a substantially vertical section; and
    forming a single semiconductor layer in the second region.

2. A method for fabricating a waveguide type optical integrated circuit element, comprising the steps of:
    forming a semiconductor layer constituting a semiconductor laser on a semiconductor substrate;
    removing a portion of the semiconductor layer corresponding to a first region by etching so as to have a substantially vertical section;
    forming a semiconductor layer constituting an optical waveguide in the first region;
    removing a portion including an interface between a light output end face of the semiconductor laser and a light incident face of the optical waveguide corresponding to a second region by etching so as to have a substantially vertical section; and
    forming a semiconductor layer of which the refractive index is substantially continuously changed in a thickness direction in the second region.

3. A method for fabricating a waveguide type optical integrated circuit element, comprising the steps of:
    forming a semiconductor layer constituting a semiconductor laser on a semiconductor substrate;
    removing a portion of the semiconductor layer corresponding to a first region by etching so as to have a substantially vertical section;
    forming a dielectric mask on the section of the semiconductor layer; and
    forming a plurality of semiconductor layers constituting an optical waveguide in the first region.

4. A method for fabricating a waveguide type optical integrated circuit element according to claim 3, wherein the step of forming a dielectric mask includes employing a bias sputtering method where sputtering is performed at the same time when a bias voltage is being applied to the semiconductor substrate.

5. A method for fabricating a waveguide type optical integrated circuit element according to claim 4, the method comprising the step of:
    matching the center of the semiconductor layer in the thickness direction with the center of the output light distribution of the semiconductor laser and the center in the native mode of the optical waveguide by controlling the flow obtained by a mass flow controller of an MOCVD apparatus.

6. A method for fabricating a semiconductor element, comprising the steps of:
    forming a first semiconductor layer on a semiconductor substrate for forming a laser;
    performing a first etching process to remove a portion of the first semiconductor layer to a depth reaching the substrate, corresponding to a first region so as to have a substantially vertical section;
    forming a second semiconductor layer in the first region for forming an optical waveguide;
    performing a second etching process to remove a portion to a depth penetrating through the entire optical waveguide, including an interface between the first semiconductor layer and the second semiconductor layer, corresponding to a second region so as to have a substantially vertical section; and forming a third semiconductor layer in the second region.

7. A method for fabricating a semiconductor element according to claim 6, wherein the third semiconductor layer is a single semiconductor layer.

8. A method for fabricating a semiconductor element according to claim 6, wherein the third semiconductor layer is a semiconductor layer of which a refractive index substantially continuously changes in a thickness direction.

9. A method for fabricating a semiconductor element according to claim 6, wherein the first semiconductor layer is a semiconductor layer constituting a semiconductor laser, and the second semiconductor layer is a semiconductor layer constituting an optical waveguide.

10. A method for fabricating a semiconductor element according to claim 7, wherein the first semiconductor layer is a semiconductor layer constituting a semiconductor laser, and the second semiconductor layer is a semiconductor layer constituting an optical waveguide.

11. A method for fabricating a semiconductor element according to claim 8, wherein the first semiconductor layer is a semiconductor layer constituting a semiconductor laser, and the second semiconductor layer is a semiconductor layer constituting an optical waveguide.

12. A method for fabricating a semiconductor element according to claim 6, further comprising the step of forming a dielectric mask between the step of performing the second etching process and the step of forming the third semiconductor layer.

13. A method for fabricating a semiconductor element according to claim 12, wherein the first semiconductor layer is a semiconductor layer constituting a semiconductor laser, and the second semiconductor layer is a semiconductor layer constituting an optical waveguide.

14. A method for fabricating a semiconductor element according to claim 12, wherein the step of forming the third semiconductor layer includes the step of forming the third semiconductor layer includes the step of selectively growing the third semiconductor layer without growing the third semiconductor layer on the dielectric mask.

15. A method for fabricating a semiconductor element according to claim 13, wherein the step of forming the third semiconductor layer includes forming a crystal-growth surface of the third semiconductor layer to be flat.

16. A method for fabricating a semiconductor element according to claim 12, wherein the step of forming the dielectric mask includes the step of forming the dielectric mask on a side wall of the second region removed by the second etching process, the step employing a bias sputtering method where sputtering is performed while a bias voltage is being applied to the semiconductor substrate.

17. A method for fabricating a waveguide type optical integrated circuit element including a semiconductor layer of which a refractive index substantially continuously changes in a thickness direction between a semiconductor laser and an optical waveguide, the method of comprising the step of:

controlling a flow obtained by a mass flow controller of an MOCVD apparatus, thereby matching the center of the semiconductor layer in the thickness direction with the center of an output light distribution of the semiconductor laser and with the center in a native mode of the optical waveguide.

* * * * *